April 13, 1965     C. E. ADLER ETAL     3,177,957
CONDITION RESPONSIVE DEVICES
Filed May 7, 1962     4 Sheets-Sheet 1

INVENTORS.
CLARENCE E. ADLER
BY FREDERICK C. CARROLL
RICHARD C. LOSHBOUGH
Marshall, Wilson, Click & Hasting
ATTORNEYS

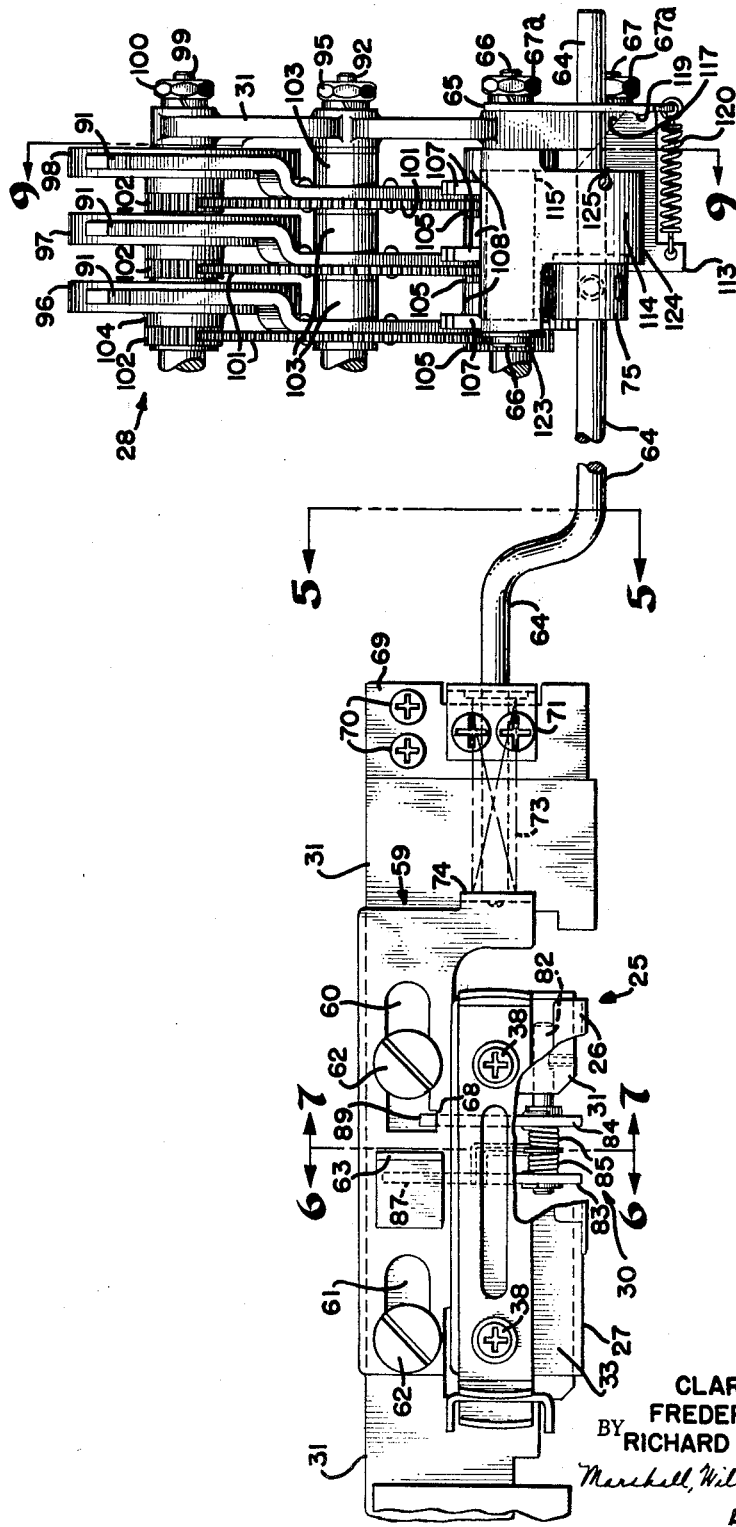

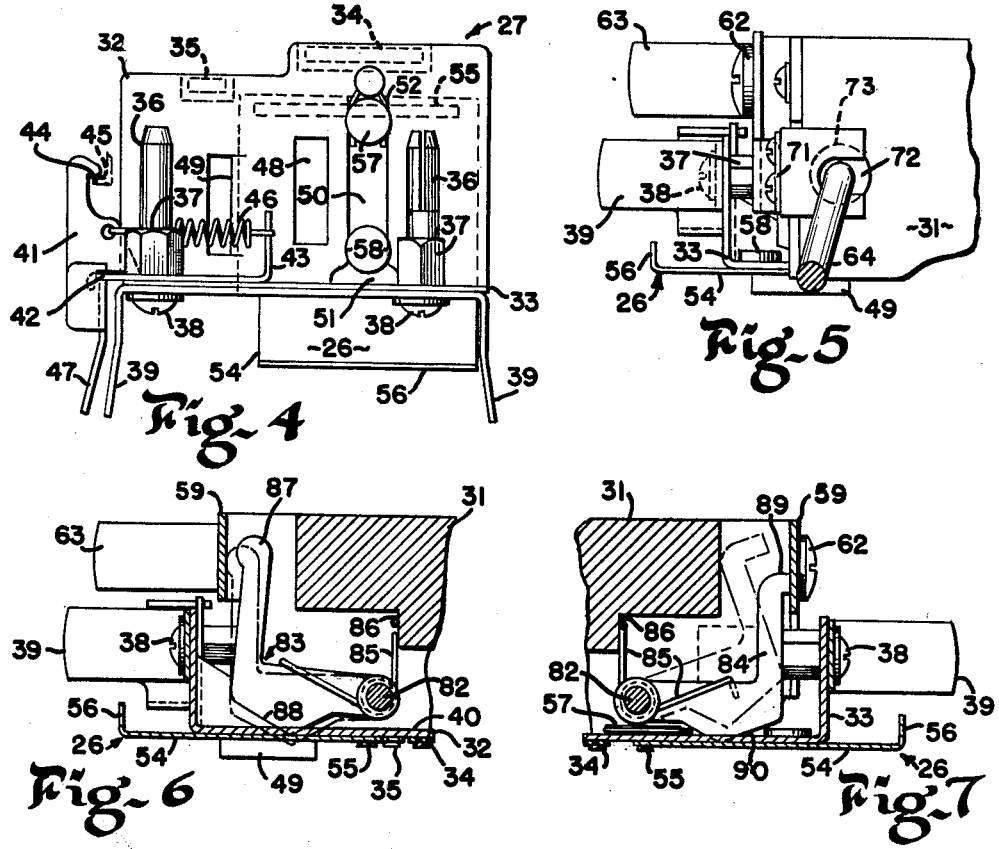
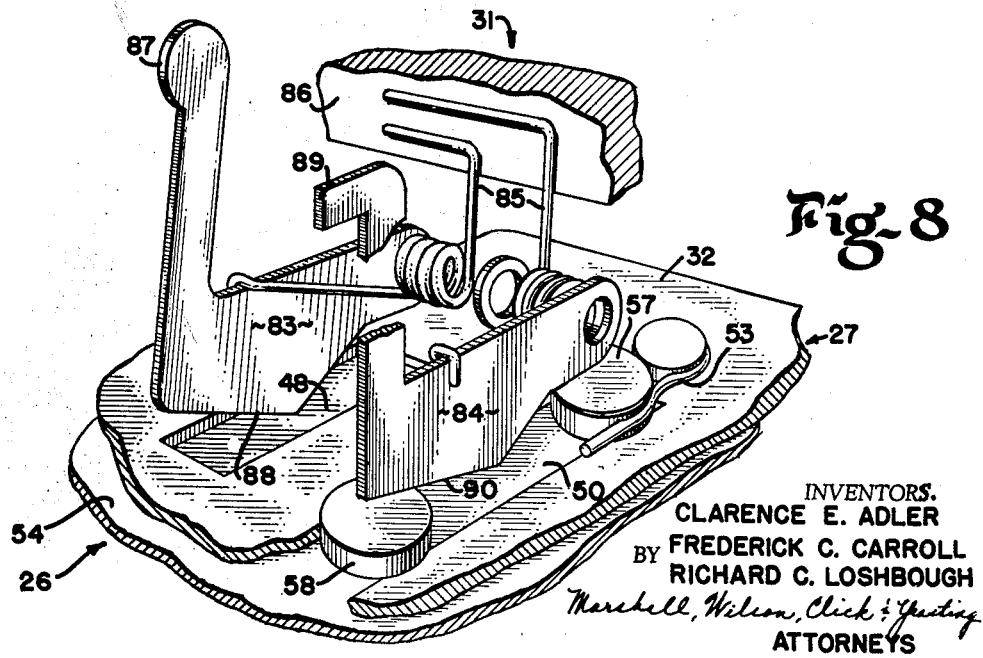

April 13, 1965   C. E. ADLER ETAL   3,177,957
CONDITION RESPONSIVE DEVICES
Filed May 7, 1962   4 Sheets-Sheet 4
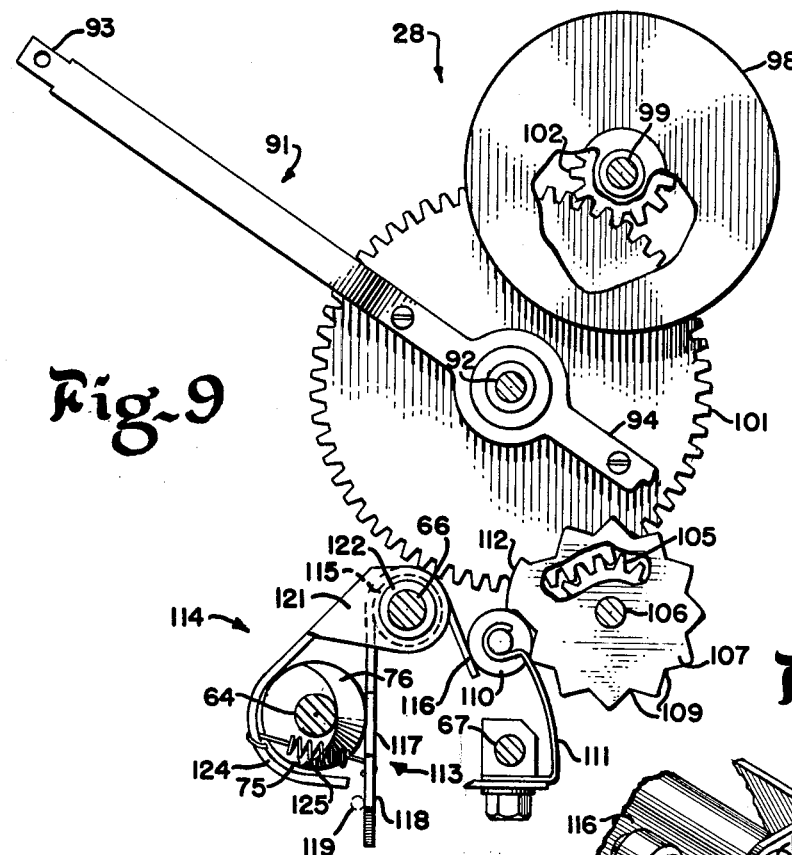
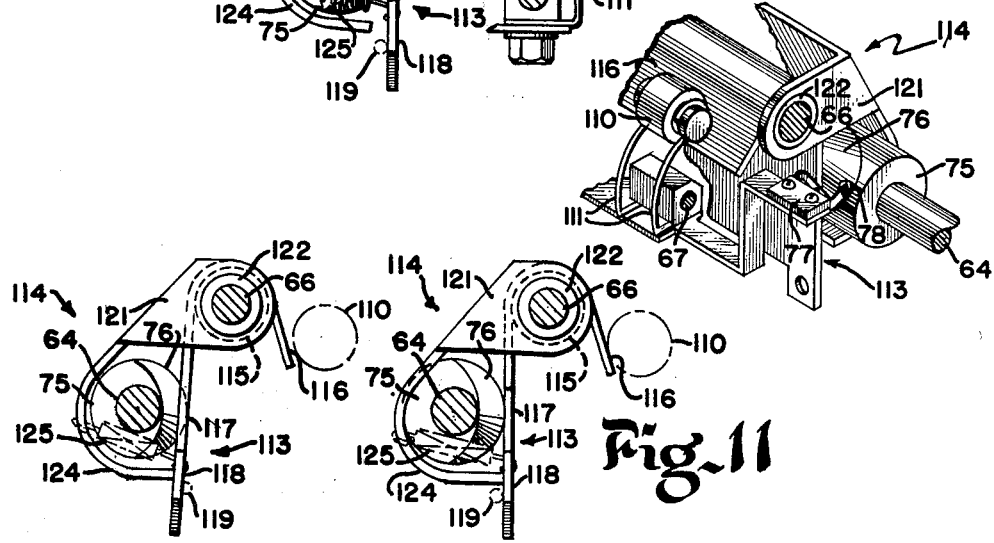
INVENTORS.
CLARENCE E. ADLER
BY FREDERICK C. CARROLL
RICHARD G. LOSHBOUGH
ATTORNEYS United States Patent Office 3,177,957
Patented Apr. 13, 1965

3,177,957
CONDITION RESPONSIVE DEVICES
Clarence E. Adler, Frederick C. Carroll, and Richard C. Loshbough, Toledo, Ohio, assignors to Toledo Scale Corporation, Toledo, Ohio, a corporation of Ohio
Filed May 7, 1962, Ser. No. 192,880
22 Claims. (Cl. 177—3)

This invention relates to improvements in condition measuring and indication devices and particularly to interlock controls for such devices, and is particularly set forth and explained as applied to an automatic weighing scale.

The interlock controls are well suited for use in the computing and printing weighing scale system disclosed in U.S. application Serial No. 92,233, filed February 28, 1961 in the names of R. E. Bell and D. B. Kendall as substitutes for corresponding controls disclosed in such application. Such weighing scale system includes weighing, computing, readout and printing apparatus constructed as a unit to weigh commodities and to issue printed tickets each bearing the net weight, price per pound, and computed value of a weighed commodity, together with such variable data as the date, store code, commodity name, and commodity grade. The commodity name, e.g., "Rib Roast," is printed by means of a commodity name printing plate or commodity identifying means (generically called a condition identifying means) which is readily removable from and replaceable in the system. The commodity grade, e.g., "U.S. Choice," is printed by means of a printing holder which functions additionally as a support for the commodity name printing plate and which also is readily removable from and replaceable in the system. The unit price for the commodity being weighed is set by a price setting means. The computer receives information as to the weight of the commodity being weighed and multiplies the weight reading times the unit price to obtain the value of the weighed commodity.

In weighing and marking packages of meat in a food store or the like, several kinds and grades of meat as well as several individual unit prices are encountered, beef, for example, having different cuts and grades. After weighing and marking a series of packages of the same cut and grade and when switching to a different cut and/or grade, it is necessary to change the above commodity printing plate and/or the grade printing holder and, if the unit price is different which usually it is, the unit price setting. When such mass production weighing of packages is accomplished, it often happens that the operator forgets to change the commodity printing plate or the grade printing holder or the unit price setting after changing one of the others. To guard against this, the above weighing scale system includes an interlock control shown in lines 49-55 of FIG. XXIII in the above application Serial No. 92,233. The prior interlock control includes means responsive to a change in the setting of the commodity printing plate or the grade printing holder for preventing operation of readout or printing or computing means unless the change is accompanied by a change in the unit price setting means. Such control also is responsive to a change in the setting of the unit price setting means to similarly prevent operation of the readout or printing or computing means unless the change is accompanied by a change in the commodity printing plate or the grade printing holder.

The above prior interlock control is unsatisfactory in the following aspects. The control includes an electrical circuit which is relatively complicated, either the commodity plate or the unit price setting means can be changed first when switching to packaging a different cut resulting in a routine which is not set for the operator, and the unit price setting means can be changed readily during operation of the overall system.

Another prior interlock control is disclosed in U.S. Patent No. 2,948,465 issued on August 9, 1960 to K. C. Allen. One of the more unsatisfactory aspects of this control resides in the relatively complicated structure and operation of the mechanical portion of the control shown in FIGS. 17-25 of the patent.

Accordingly, the objects of this invention are to improve the apparatus for and the techniques of interlock control of condition measuring and indication devices, and to simplify such apparatus and techniques.

One embodiment of this invention enabling the realization of these objects is an interlocked control, having improved and simplified electrical and mechanical portions, for an automatic weighing scale or other condition responsive apparatus. Such a weighing scale includes weighing mechanism, scanning computing, readout and printing means, together with commodity identifying means and price setting means.

When switching from packaging one cut of beef, for example, it is necessary to change the commodity identifying means and usually the price setting means. The mechanical portion of the interlock control permits changing the commodity identifying means during or after a weighing cycle. However, the mechanical portion of the interlock control prevents changing the price setting means until after the commodity identifying means is moved.

Removal of the commodity identifying means from the system causes the mechanical portion of the interlock control to unlock the price setting means, to operate a switch in the electrical portion of the control, and to mechanically prevent reoperation of the switch until after the commodity identifying means has been replaced and the price setting means changed. Operation of the switch prevents operation of the computing, readout and printing means.

After the commodity identifying means has been replaced and the price setting means changed, it is possible for the scale operator to manipulate a mechanical slide. Manipulation of the slide mechanically locks the price setting means until after the next move of the commodity identifying means and reoperates the switch to enable operation of the overall weighing scale system and to permit printing to take place after one successful cycle of the scanning means.

In accordance with the above, one feature of this invention resides in a simplified electrical control circuit for the interlock control. Comparing the circuit of the invention to the interlock control shown in lines 49-55 of FIG. XXIII in the above application Serial No. 92,233, the circuit of the invention accomplishes what the prior circuit does and more with one relay, its contacts and one switch less than the prior circuit.

Another feature resides in mechanically locking the price setting means before the start of an operating cycle. This prevents change in the setting of the price setting means during computation which can be done in both of the above prior interlock controls, and prevents change in the setting of the price setting means before change in the commodity identifying means resulting in a set routine for the scale operator.

Still another feature resides in a simplified mechanical portion of the interlock control. The mechanical portion permits change of the commodity identifying means at any time before, during or after a cycle of the weighing system without manipulation of a mechanical latch. However, should such change come during the cycle, the cycle is stopped automatically to prevent the printing of erroneous information. The price setting means is locked before the start of an operating cycle by simplified latch means which automatically unlocks upon removal of the commodity identifying means.

The above and other objects and features of this invention will be appreciated more fully from the following detailed description when read with reference to the accompanying drawings wherein:

FIG. 1 is a block diagram corresponding generally to FIG. I in the above U.S. application Serial No. 92,233 illustrating the general organization of equipment for reading a condition responsive member of a weighing mechanism and indicating such reading in digital form suitable for recording and also multiplying such reading by an arbitrarily selected price factor and indicating the product in a form (value) suitable for visual indication and/or recording;

FIG. 3 is a front elevational view of the mechanical portion of the interlock control of the invention located in a printer, the printer being shown only fragmentarily;

FIG. 4 is a plan view of a commodity name printing plate and a commodity grade printing holder therefor which are shown in FIG. 3 in operative position in the printer;

FIG. 5 is a vertical sectional view taken along the line 5—5 of FIG. 3;

FIG. 6 is a vertical sectional view taken along the line 6—6 of FIG. 3;

FIG. 7 is a vertical sectional view taken along the line 7—7 of FIG. 3;

FIG. 8 is an enlarged fragmentary, perspective view of the left side of the interlock control as viewed in FIG. 3;

FIG. 9 is an enlarged, vertical sectional view taken along the line 9—9 of FIG. 3;

FIG. 10 is a sectional view corresponding to the lower, left portion of FIG. 9 illustrating the parts in different operative positions;

FIG. 11 is a sectional view corresponding to FIG. 10 illustrating the parts in different operative positions; and FIG. 12 is a fragmentary perspective view as seen from a position near the bottom and to the right of the device shown in FIG. 9 and looking toward the left.

Figure 1:
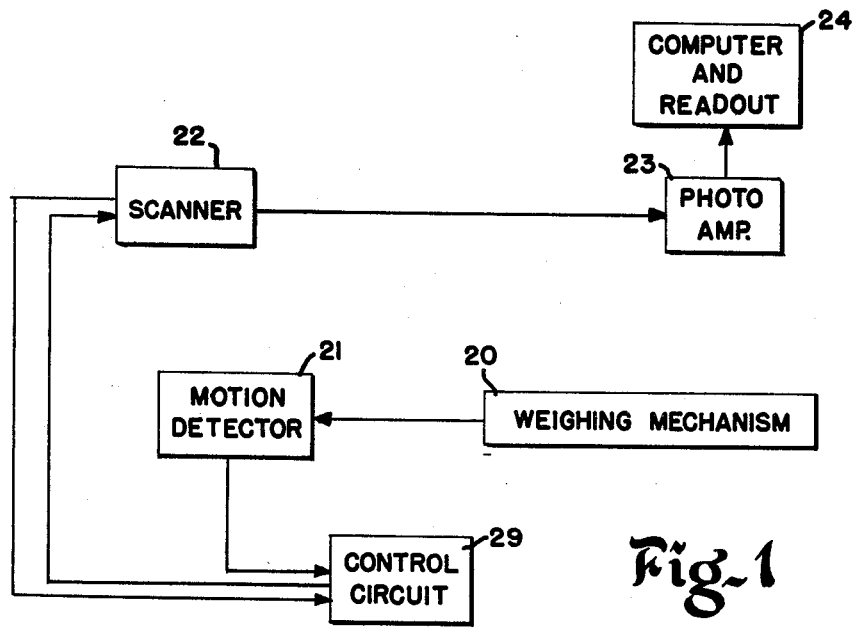

Referring to FIG. 1, there is shown an electronic computing weighing scale system embodying the teachings of this invention. The system is disclosed in detail in the above application Serial No. 92,233, FIG. 1 corresponding generally to FIG. I in such application. The system consists of three primary units. First, there is a scale and scanner unit which includes weighing mechanism 20, a motion detector 21, a scanner 22 and a photo amplifier 23, second, a computer and, third, a readout, the computer and readout both being indicated by the reference number 24. The computer, as shown in FIG. I in the above U.S. application 92,233, includes a pulse shaper-blocking oscillator section, a multiplier, weight counters, and value counters. The readout, as also shown in the above application 92,233, includes readout circuits, a check circuit, and a printer, the printer being shown fragmentarily in FIG. 3 and identified by reference number 25.

The weighing scale system weighs commodities and issues printed tickets each bearing the net weight, price per pound, and computed value of a weighed commodity, together with such variable data as the date, store code, commodity name and commodity grade. The commodity name, e.g., "Rib Roast," is printed by means of a commodity name printing plate 26 which is readily removable from and replaceable in the printer 25. The commodity grade, e.g., "U.S. Choice," is printed by means of a grade printing holder 27 which functions additionally as a support for the commodity printing plate 26 and which also is readily removable from and replaceable in the printer 25. The unit price of the commodity being weighed is set by means of a unit price or multiplier factor setting means 28.

In weighing and marking packages of meat in a food store or the like, several cuts and grades of beef, for example, as well as several individual unit prices are encountered. After weighing and marking a series of packages of the same cut and grade and when switching to a different cut and/or grade, it is necessary to change the commodity name printing plate 26 and/or the grade printing holder 27 and, if the unit price is different which usually it is, the setting of the price setting means 28. When such mass production weighing of packages is accomplished, it often happens that the operator forgets to change the commodity name printing plate 26 or the commodity grade printing holder 27 or the setting on the price setting means 28 after changing one of the others. To guard against this, the interlock control of the invention is provided and, in the system disclosed in the above application Serial No. 92,233, the interlock control shown in lines 49–55 of FIG. XXIII is provided, such FIG. XXIII showing part of a master control and sequencing circuit shown completely in FIGS. XXII, XXIII and XXIV. A corresponding control circuit 29 is shown in FIG. 1.

Figure 2:
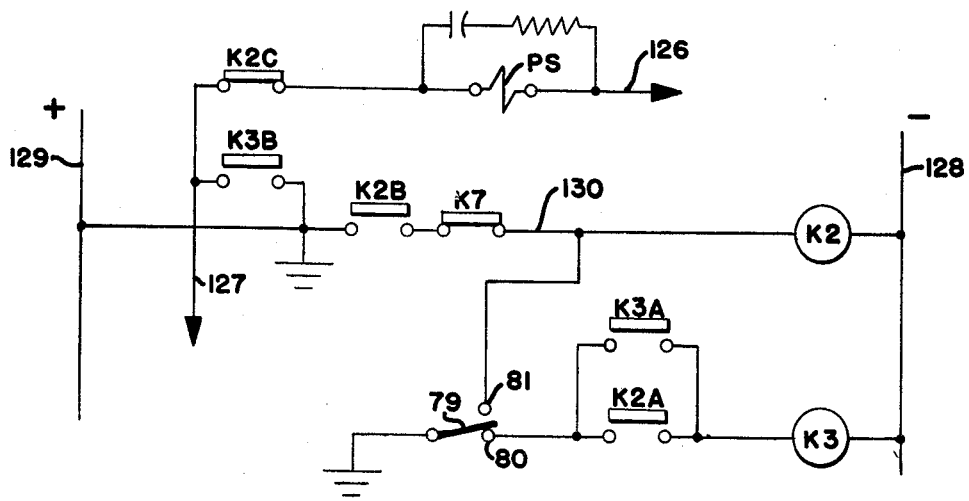
FIG. 2 is a schematic diagram of a fragment of the control circuit shown in FIG. 1, corresponding to lines 49–55 of FIG. XXIII in the above U.S. application Serial No. 92,233, and shows the electrical portion of the interlock control of the invention.

FIG. 2 is a schematic diagram of a fragment of the control circuit 29 shown in FIG. 1 and corresponds to lines 49–55 of FIG. XXIII in the above application Serial No. 92,233. The simplified circuit shown in FIG. 2 as hereinafter described accomplishes what the prior circuit shown in such lines 49–55 of FIG. XXIII does and more even with the elimination of change price relay K1 and its contacts and price change switch SW9 shown in such lines 49–55. That is, the control circuit 29 is like the circuit shown in FIGS. XXII, XXIII, and XXIV in the above application Serial No. 92,233, except that the portion of the circuit 29 shown in FIG. 2 is different from the portion of the prior circuit shown in lines 49–55 of FIG. XXIII. Lead 126 in FIG. 2 at the horizontal arrow head is connected to the left hand terminal of switch SW14 shown in line 49 of FIG. XXIII in the above application Serial No. 92,233 and lead 127 in FIG. 2 at the vertical arrow head is connected to the movable arm of switch SW25–C shown in line 56 of such FIG. XXIII, the circuitry shown in FIG. 2 being substituted for the circuitry shown in line 49 to the left of the left hand terminal of switch SW14 and in all of lines 50–55 of such FIG. XXIII.

The printer 25 (FIG. 3) is shown and described in detail in U.S. application Serial No. 791,728 filed February 6, 1959 in the names of C. E. Adler and F. C. Carroll, FIG. 3 corresponding to FIG. I in such application, and includes a printing station 30 which corresponds to printing station 2 shown in such application. A commodity name printing plate and a commodity grade printing holder which are quite similar to the plate 26 and holder 27, respectively, are shown and described in detail in U.S. Patent No. 2,953,989 issued September 27, 1960 to T. W. Gittus.

The commodity grade printing holder 27 is easily and accurately located in the printer 25. The holder may or may not bear printing indicia. For example, there are no grades of cheese, luncheon meat, etc., while beef is graded U.S. Prime, Choice, Good, Utility or Commercial. The commodity name printing plate 26 is easily and accurately located in the holder 27; it is readily removable either by removing the holder from the printer or removing the name plate from the holder. When in place in the printer, the printing type on the name plate are juxtaposed to any printing type on the holder. Both the commodity grade printing holder and the commodity name plate are formed with easy to grasp handle means, formed to be located in the printer in one position only.

and have identification indicia in view of the operator so that he can tell at a glance which holder and plate are in the printer. In pre-packaging beef, the commodity grade printing holder 27 is chosen which corresponds to the grade of the beef being processed. This holder is seldom changed. The holder is positioned in the printer and is not disturbed as long as the same grade of beef is being processed. Commodity name printing plates 26 are substituted one for the other as various cuts are pre-packaged. The printing for example, of "U.S. Choice Rib Roast" and "U.S. Choice Sirloin Steak" requires one of the grade printing holders and two of the commodity plates.

The commodity grade printing holder 27 and the commodity name plate 26 are shown at the printing station 30 in FIG. 3 in operative positions in a frame 31 of the printer 25. Tickets or labels (not shown) are pressed against the holder and plate after they are inked by a platen roller (not shown).

The commodity grade printing holder 27 functions both as a printing means and as a holder for the commodity name plate 26; it includes a flat printing plate supporting portion 32 and a part or edge 33 which is bent or turned up out of the plane of the supporting portion 32. The bent part 33 of the holder 27 functions as a place to put identification indicia (not shown) which correspond to printing type 34 carried by the supporting portion 32 of the holder 27. These type 34 can be made, for example, of rubber, metal or plastic and can be formed integrally with the holder or made separately and attached by means of an adhesive and are used to print the grade of beef being pre-packaged. For commodities, such as cheese or luncheon meat, which are not graded the area of the holder occupied by the type 34 is left blank. The holder 27 also carries type 35 for printing a store code.

The bent part or front holder portion 33 also functions as a support for a pair of pins 36 each of which includes a shoulder 37, the pins 36 being held on the front holder portion by screws 38 which also function to attach a handle 39, having a flat-bottomed U shape, to the front holder portion 33. The pins 36 are received in horizontal openings in the printer frame 31 in the same way that corresponding pins disclosed in the above Patent No. 2,953,989 are received in horizontal openings in a printer frame with the shoulders 37 against abutment surfaces of the printer frame 31 to accurately locate the type 34 and 35 in the printing station 30 and with the upper surface of the type bearing portion 32 against an abutment surface 40 of the printer frame 31 to impart stability to the holder 27. The holder 27 is held on the printer frame 31 with the pins 36 in the openings in the printer frame by means of a latch 41 hinged at 42 on an L-shaped bracket 43 anchored on the front holder portion 33 by means including one of the screws 38 and having a catch surface 44 engageable with an abutment surface 45 (FIG. 4) of the printer frame 31. A spring 46 extending between the latch 41 and the bracket 43 urges the latch 41 in a clockwise direction as viewed in FIG. 4 about the axis of the hinge. The holder 27 is removed from the printer frame 31 by grasping a handle 47 fixed to the latch 41 and the handle 39 on the holder 27, pivoting the latch 41 in opposition to the spring 46 until the catch surface 44 on the latch 41 is clear of the abutment surface 45 on the printer frame 31, and withdrawing the pins 36 from the openings in the printer frame 31. The holder 27 is replaced by grasping the handles 39 and 47, pivoting the latch 41 in opposition to the spring 46, and inserting the pins 36 into such openings as far as the shoulders 37 allow. Release of the handles permits the spring 46 to move the latch 41 into its latched position.

The commodity grade printing holder 27 is provided with a hole 48 in the type bearing portion 32, a turned-down edge 49 on the type bearing portion 32, and a slot 50 in the type bearing portion 32 which extends from the front portion 33 of the holder toward the printing type 34 on the holder, the slot 50 being transverse to such type and having an enlarged open end 51 at the front holder portion 33 and a closed end 52 remote from the front holder portion 33. A spring clip or keeper 53 is secured to the type bearing portion 32 of the holder 27 at the closed end of the slot with its open mouth facing the slot, the spring clip 53 being on the upper surface of the type bearing portion 32 and the type 34 and 35 being on the lower surface of the type bearing portion 32.

The commodity name printing plate 26 includes a flat portion 54 bearing type 55 and a front portion 56 which is bent out of the plane of the type bearing portion and that is suitable for use as a handle and as a place to put identification indicia corresponding to the type 55. A shouldered guide and lock pin 57 and a shouldered guide pin 58 are carried by the upper surface of the type bearing plate portion 54, the lower surface of the type bearing plate portion 54 being the surface on which the type 55 are located. The commodity name printing plate 26 is inserted in the holder 27 by inserting the guide and lock pin 57 in the enlarged open slot end 51 and then the other pin 58 until the pin 57 contacts the closed slot end 52, the left edge of the printing plate 26 as viewed in FIG. 4 being guided during insertion by the turned-down edge 49 on the type bearing portion 32 of the holder 27. The edges of the commodity grade printing holder 27 along the slot 50 fit snugly between the shoulders on the pins 57 and 58 and the upper surface of the type bearing portion 54 of the printing plate 26. The head on the pin 57 expands the spring clip 53 as it approaches the closed slot end 52, the clip resiliently returning to its original position to embrace the head when the printing plate 26 is inserted fully in its holder to retain the plate 26 in the holder in a readily removable condition. In the inserted position, the type 55 on the printing plate 26 are juxtaposed to the type 34 on the holder in an accurately located position, the type 55 printing the name of the cut of the beef being pre-packaged and the type 34 on the holder 27 printing the grade of the beef being pre-packaged. The commodity name printing plate 26 can be readily removed from the printer 25 either by sliding it out of the slot 50 or by removing the holder 27 from the frame 31 of the printer 25.

To guard against the operator forgetting to change the commodity name printing plate 26 or the commodity grade printing holder 27 or the setting on the price setting means 28 after changing one of the others when switching to pre-packaging a different cut and/or grade of beef, the interlock control of the invention is provided; it includes a slide 59 having two slots 60 and 61, each receiving a shoulder screw 62 carried by the printer frame 31, the slide 59 being slidable at such slots on the shoulders of the shoulder screws 62, a handle 63 on the slide 59, and a horizontally extending rod 64 fixed to the slide 59 and slidable in a bearing (not shown) in a plate 65 fixed to the right hand part of the printer frame 31 as viewed in FIG. 3 by means of stationary shafts 66 and 67 and nuts 67a. The slots 60 and 61 extend horizontally, the left end of the slot 60 as viewed in FIG. 3 having a latching notch 68 for a purpose hereinafter described. A bracket 69 attached to the printer frame 31 by means of screws 70 supports an angle bracket 71 which defines an open-ended slot 72 (FIG. 5) in which the rod 64 is slidable. A spring 73 surrounds the rod 64 between the angle bracket 71 and a shoulder 74 on the slide 59, and, by being compressed between the stationary bracket 71 and the shoulder 74 on the slide 59, urges the slide 59 toward the left as viewed in FIG. 3. A collar 75 on the rod 64 has a curved surface 76 (FIGS. 9–12) which functions both to operate a stationarily mounted switch 77 (FIG. 12) and as a cam surface for a purpose hereinafter described. The collar 75, in its position shown in FIG. 3, is in operative position against an operating roller 78 (FIG. 12) of the switch 77, contact 79 (FIG.

2) of the switch 77 being on a terminal 80 in this position of the collar 75. Movement of the collar 75 to the left, as viewed in FIG. 3, releases the switch roller 78 and the contact 79 moves to engage a terminal 81 (FIG. 2).

The printer frame 31 supports a horizontally extending pawl journal pin 82 journaling two pawls 83 and 84. As best shown in FIG. 8, these pawls 83 and 84 are urged counterclockwise, as viewed in FIG. 8, about the axis of the pawl journal pin 82 by means of torsion springs 85 surrounding the pin 82 and each having an end hooked over its respective pawl and an end bearing against a vertical wall 86 of the printer frame 31.

Referring to FIG. 6, the pawl 83 includes a rounded upper end 87 located between the printer frame 31 and the slide 59 and a V-shaped lower end 88. When the commodity name printing plate 26 is in the printer as shown in FIG. 6, the V-shaped lower pawl end 88 rests, as urged by its torsion spring 85, upon the printing plate 26, the V-shaped lower pawl end 88 extending through the hole 48 in the commodity grade printing holder 27 to reach the printing plate 26. In this position, as shown in solid lines in FIG. 6, the printing plate 26 holds the pawl 83 up in opposition to the torsion spring 85 with the rounded upper pawl end 87 located in space between the printer frame 31 and the slide 59. Removal of the printing plate 26 from the printer permits the torsion spring 85 to pivot the pawl 83 counterclockwise about the axis of the pin 82 as viewed in FIG. 6, until the rounded upper pawl end 87 bears against the slide 59, as shown in broken lines in FIG. 6.

Referring to FIG. 7, the pawl 84 includes a horizontally extending upper end 89 and a V-shaped lower end 90. When the commodity name printing plate 26 is in the printer as shown in FIG. 7, the V-shaped lower pawl end 90 rests, as urged by its torsion spring 85, upon the printing plate 26, the V-shaped lower pawl end 90 extending through the slot 50 in the commodity grade printing holder 27 to reach the printing plate 26. In this position, as shown in solid lines in FIG. 7, the torsion spring 85 so urges the pawl 84 clockwise about the pin 82 that the upper pawl end 89 projects into the latching notch 68 (FIG. 3) in the slide 59. Removal of the printing plate 26 from the printer causes the guide and lock pin 57 on the plate 26 to engage the V-shaped lower pawl end 90 and momentarily lift the pawl 84 into the position shown in broken lines in FIG. 7 in opposition to the torsion spring 85. This removes the upper pawl end 89 from the latching notch 68 in the slide 59.

The solid line positions of the pawls 83 and 84 shown in FIGS. 6 and 7, respectively, correspond to the positions of such pawls as shown in FIG. 3 with the slide 59 in its position shown in FIG. 3. In such position of the pawl 84 and the slide 59, engagement of the upper pawl end 89 in the latching notch 68 in the slide 59 prevents movement of the slide. Removal of the printing plate 26 from the printer by causing the pawl 84 to be momentarily lifted to remove the upper pawl end 89 from the latching notch 68, as described above, permits the spring 73 to move the slide 59 and the attached rod 64 to the left as viewed in FIG. 3 with trigger-like action. As soon as the guide and lock pin 57 on the printing plate 26 is disengaged from the V-shaped lower pawl end 90 during removal of the printing plate 26 from the printer, the respective torsion spring 85 urges the pawl 84 back toward its solid line position shown in FIG. 7. However, by that time movement of the slide 59 to the left, as viewed in FIG. 3, has moved the latching notch 68 to the left out of the way of the upper pawl end 89 and the upper pawl end 89 is received in the large part of the slot 60 to the right of the latching notch 68, as viewed in FIG. 3, in which position the upper pawl end 89 is inoperative. Removal of the printing plate 26 from the printer as also described above permits the respective torsion spring 85 to pivot the pawl 83 until the rounded upper pawl end 87 bears against the slide 59, as shown in broken lines in FIG. 6. During the above movement of the slide 59 to the left following removal of the printing plate 26 from the printer, the slide 59 slides on the rounded upper pawl end 87 until the slot 60 in the slide 59 reaches the pawl 83 whereupon the upper pawl end 87 moves into the slot 60 at the latching notch 68 as urged by its torsion spring 85. Engagement of the pawl 83 in the slide slot 60 prevents return movement of the slide to the right, as viewed in FIG. 3, under force applied manually to the slide handle 63.

The price setting means 28 includes three arms 91 each pivotally mounted intermediate its ends on a stationary shaft 92 and having a finger-engageable upper handle portion 93 and a lower contact operating portion 94 which closes contact points on a price selector switch board (not shown). The shaft 92 is held stationary on the printer frame 31 by means of a nut 95. Contact brushes on the lower arm portions 94 and the price selector switch boards are shown in FIG. 1 in the above application Serial No. 92,233. As above described, the unit price for the commodity being weighed is set in the weighing scale system by the price setting means 28 and the computer multiplies such unit price by the weight of the commodity to obtain the value of the weighed commodity. If, for example, the meat being pre-packaged and identified as to cut and grade by the particular printing plate 26 and printing holder 27, respectively, in the printer 25 costs $1.25 per pound, the arms 91 are rocked until a left hand number wheel 96, as viewed in FIG. 3, indicates "1," a middle number wheel 97 indicates "2," and a right hand number wheel 98 indicates "5," each of the number wheels 96-98 being mounted for rotation on a shaft 99 held stationary on the printer frame 31 by means of a nut 100 and being gear-connected to its respective price setting arm 91 by means of a gear 101 attached to such arm 91 and rotatably mounted on the stationary shaft 92 and a gear 102 attached to such number wheel and rotatably mounted on the stationary shaft 99. Movements of the arms 91 to set the numbers wheels 96-98 to read "1.25" sets "1.25" on the above price selector switch boards, setting the price factor "1.25" into the computer. Also, movements of the arms 91 to set up the number wheels 96-98, by means not shown, set up print wheels in the printing station 30 to corresponding positions, the printer 25 printing the unit price on the ticket in the position shown in the above U.S. application Serial No. 791,728. Hubs 103 on the price setting arms 91 space the arms 91 and their attached gears 101 along the stationary shaft 92 and hubs 104 on the number wheels 96-98 function as a means for connecting the number wheels 96-98 to their attached gears 102 and as spacers for spacing the number wheels 96-98 and the gears 102 along the stationary shaft 99.

The gears 101 also mesh with gears 105 rotatably mounted on a stationary shaft 106 (FIG. 9), each of the gears 105 being attached to a detent wheel 107 rotatably mounted on the shaft 106 and having a hub 108, the hubs 108 serving to space the detent wheels 107 and the gears 105 along the stationary shaft 106. Cooperating with eleven notches 109, one for each of the numbers 0-9 and a blank on the corresponding number wheel, around each of the detent wheels 107 are index wheels 110 mounted on spring members 111 carried by the stationary shaft 67 which also carries the switch 77 as shown in FIG. 12, the index wheels 110 being urged into engagement with the detent wheels 107 by means of the spring members 111. When the index wheels 110 are unlatched by a portion of the interlock control hereinafter described, movements of the price setting arms 91 cause corresponding movements of the detent wheels 107 causing the index wheels 110 to move into and out of the wheel notches 109, the detent wheels 107 driving the index wheels 110 out of the wheel notches 109 and the spring members 111 driving the index wheels 110 into the wheel notches 109. Upon release of the price setting arms 91 by the scale operator, those of the index wheels 110 which do not happen to be received in the wheel notches 109 shift the detent wheels 107 until such index wheels 110 do enter such wheel notches 109 fully. This moves the gear trains slightly and ensures that the price setting means 28 is never set between numbers, i.e., all of the price setting levers 91 always are properly indexed. A high spot 112 on each of the detent wheels 107 serves as a stop preventing the turning of the price setting arms 91 beyond the ends of their operating ranges.

The interlock control also includes a pair of latch members 113 and 114. The latch member 113 is fixed to a tube 115 pivotally mounted on the stationary shaft 66 and is formed by bending from flat stock to include an index wheel locking tongue 116 of a length great enough to be engageable with all of the index wheels 110 and a downwardly extending part 117 having a vertical surface 118 engageable with the convex surface of a dimple 119 on the stationary vertical plate 65. A spring 120 interconnects the latch member 113 and the vertical plate 65 and urges the latch member 113 into contact with the vertical plate 65. The latch member 114 has a pair of wings 121 each defining a hole 122 receiving the stationary shaft 66 for pivotally mounting the latch member 114, the tube 115 and the latch member 113 being located on the shaft 66 between the wings 121. A clip 123 holds the latch members 113 and 114 on the stationary shaft 66. The latch member 114 also includes a locking arm 124 which is urged toward the downwardly extending part 117 of the latch member 113 by means of a spring 125 interconnecting the locking arm 124 and such downwardly extending part 117. There is enough play in the pivotal mounting of the latch member 113 that the vertical surface 118 of the latch member 113 can be forced by the convex surface of the dimple 119 on the stationary vertical plate 65, the surface 118 moving over the dimple 119 in opposition to the spring 120 which holds the vertical surface 118 in contact with the vertical plate 65.

In the position of the interlock control shown in FIG. 3 with the commodity name printing plate 26 in the printer and the pawl end 89 received in the notch 68 in the slide 59, the curved surface 76 on the collar 75, as described above, is in operative position against the operating roller 78 of the switch 77. In such position, the collar 75, as shown in FIG. 9, is received in a space between the downwardly extending part 117 of the latch member 113 and the locking arm 124 of the latch member 114, the collar holding the bottom of the locking arm 124 out of contact with the latch member 113 in opposition to the spring 125 and preventing movement of the latch member 113 about the axis of the stationary shaft 66 to maintain the locking tongue 116 of the latch member 113 in engagement with the three index wheels 110. This engagement of the locking tongue 116 with the index wheels locks the price setting means 28, i.e., the price setting arms 91 cannot be moved. In this position of the interlock control, the vertical surface 118 of the latch member 113 is to the right, as viewed in FIG. 9, of the dimple 119 on the stationary plate 65. Movement of the collar 75 to the left, as viewed in FIG. 3, permits the spring 125 to return the locking arm 124 into engagement with the downwardly extending part 117 of the latch member 113, as shown in FIG. 11, and unlocks the price setting means 28. Movement of one or ones of the unlocked price setting arms 91 to a new unit price position drives a corresponding one or more of the index wheel 110 out of the respective detent wheel notch 109 or notches 109 driving the locking tongue 116 about the axis of the stationary shaft 66 into the position shown in FIG. 10 wherein the vertical surface 118 of the latch member 113 is to the left of the dimple 119 on the stationary plate 65, the dimple 119 preventing the return of the locking tongue 116 into engagement with the index wheels 110 when the index wheels 110 again are received in the detent wheel notches 109. The locking arm 124 in its position shown in FIG. 11 (latch member part 117 to the right of the dimple 119) prevents movement of the collar 75 to a position between the locking arm 124 and the downwardly extending part 117 of the latch member 113. The locking arm 124 in its position shown in FIG. 10 (latch member part 117 to the left of the dimple 119) does not prevent movement of the collar 75 to a position between the locking arm 124 and downwardly extending part 117 of the latch member 113, such movement of the collar 75 causing the curved surface 76 on the collar 75 to cam the latch members 113 and 114 into the positions shown in FIG. 9, i.e., with the latch member part 117 to the right of the dimple 119 with the locking tongue 116 in engagement with the index wheels 110 and the locking arm 124 out of engagement with the latch member part 117.

In the overall operation of the mechanical portion of the interlock control, when switching to pre-packaging a different cut of beef, it is necessary for the scale operator to replace the commodity name printing plate 26 with another and probably to reset the price setting means 28. He cannot reset the price setting means 28 at this time, because, as shown in FIG. 9, the collar 75 holds the locking tongue 116 of the latch member 113 in engagement with the three index wheels 110. However, the scale operator can easily remove the commodity name printing plate 26 at this time, or any time, by simply grasping and pulling its handle portion. Removal of the plate 26, by causing the pawl 84 to be momentarily lifted to remove the upper pawl end 89 from the latching notch 68 in the slide 59, permits the spring 73 to move the slide 59 and the attached rod 64 to the left as viewed in FIG. 3 with trigger-like action. The upper pawl end 87 then moves into the slot 60 at the latching notch 68 and prevents return movement of the slide 59 to the right, as viewed in FIG. 3, under force applied manually to the slide handle 63. Such movement of the rod 64 to the left carries the collar 75 out of its operative engagement with the switch actuating roller 78, the contact 79 moving to engage the terminal 81, and carries the collar 75 out of its price setting means locking position shown in FIG. 9 to its position shown in FIG. 11 wherein the price setting means is unlocked. As hereinafter described, movement of the contact from terminal 80 to terminal 81 prevents operation of the automatic weighing scale system until the switch 77 is operated again. Switch 77 cannot be operated again until a commodity name printing plate 26 is inserted in the printer, the price setting means 28 changed, and the slide 59 returned by finger pressure on the slide handle 63 to operate the switch 77.

Once the commodity name printing plate 26 has been removed from the printer and the price setting means 28 unlocked, either the printing plate 26 or the price setting means 28 can be reset first. However, the slide 59 cannot be returned at this time because it is latched in two places, one, by means of the upper pawl end 87 in the slide slot 60 and, two, by means of the locking arm 124 in its position shown in FIG. 11 wherein the locking arm 124 prevents movement of the collar 75 to the right as viewed in FIG. 3.

Replacement of the commodity name printing plate 26 causes the plate 26 to pivot the pawl 83 into its position shown in solid lines in FIG. 6 unlocking the slide 59 at the pawl 83, the pawl 84 still being inoperatively located in the large part of the slide slot 60 to the right of the latching notch 68.

Movement of one or more of the price setting arms 91 to a new unit price position moves the locking arm 124 into its position shown in FIG. 10 wherein the locking arm 124 does not obstruct movement of the collar 75. The slide 59 now is free to be moved to the right back to its position shown in FIG. 3.

Movement of the slide 59 by means of finger pressure on the slide handle 63 to the right back to its position shown in FIG. 3 permits the pawl 84 to be so pivoted by its torsion spring 85 when the latching notch 68 reaches the pawl 84 that the upper pawl end 89 is received in the notch 68, the upper pawl end 89 previously being held back in an inoperative position by the bottom edge of the slide slot 60 to the right of the slide notch 68. This relatches the slide 59. Such movement of the slide 59 to the right also causes the collar 75 to operate the switch 77 enabling operation of the automatic weighing scale system (except the printer as hereinafter described) and causes the collar 75 to cam the latch members 113 and 114 into their positions shown in FIG. 9 with the locking tongue 116 in engagement with the index wheels 110. This locks the price setting means 28 against movement until the commodity name printing plate 26 is removed from the printer.

The overall operation of the mechanical portion of the interlock control has been described above in connection with a change in the commodity name printing plate 26. No change in this operation occurs when the commodity grade printing holder 27 is changed. Since, as described above, removal of the holder 27 from the printer also causes removal of the printing plate 26.

One of the features of the mechanical portion of the interlock control resides in locking the price setting means 28 before the start of an operating cycle. This prevents change in the setting of the price setting means during computation as can be done in all known prior interlock controls. During computation, the printing plate 26 could be removed unlocking the price setting means 28. But this could not be done inadvertently and, in any event, removal of the printing plate 26 by operation of the switch 77 prevents further operation of the automatic weighing scale system. Hence, mechanically locking the price setting means 28 before the start of an operating cycle prevents change in the setting of the price setting means during computation.

Mechanically locking the price setting means 28, as above described, prevents change in the setting of the price setting means before a change is made in the commodity name printing plate 26 resulting in a set routine for the scale operator.

A further feature resides in the superior simplicity of the mechanical portion of the interlock control. Change of the commodity name printing plate 26 is permitted at any time before, during or after a cycle of the weighing system without manipulation of a mechanical latch. Removal of the printing plate 26 causes the price setting means to be unlatched automatically which price setting means cannot be relatched enabling operation of the automatic weighing scale system until a printing plate 26 has been reinserted into the printer and a change made in the setting of the price setting means.

Referring to FIG. 2, assume that a previous series of packaged commodities has just been weighed and the weighing of a new series of packaged commodities is about to begin. The operator removes the commodity name printing plate 26 causing the contact 79 to move from the terminal 80 to the terminal 81. This breaks a previously closed circuit from a main lead 128 through the coil of a relay K3, closed relay contacts K3A and the contact 79 to ground. Deenergization of the relay K3 causes the relay contacts K3A and K3B to open. The relay contacts K3A are in a seal-in circuit to the relay K3 and relay contacts K3B, when closed, enable the rest of the control circuit 29 (FIG. 1) in the same way that the closing of relay contacts K3 in line 55 of FIG. XXIII in the above application Serial No. 92,233 enable the rest of the control circuit shown in FIGS. XXII, XXIII and XXIV in such application. Opening of the relay contacts K3B, by disabling the rest of the control circuit, prevents computation of a total value.

Movement of the contact 79 from the terminal 80 to the terminal 81, upon removal of the commodity name printing plate 26 from the printer, completes a circuit from the lead 128 through the coil of a relay K2 and the contact 79 to ground. Energization of the relay K2 causes the relay contacts K2A and K2B to close and K2C to open. Opening of the relay contacts K2C prevents operation of a print solenoid PS. This is the same print solenoid as is shown (print solenoid PS) in line 49 of FIG. XXIII in the above application Serial No. 92,233. Closing of the relay contacts K2B seals in the circuit from the lead 128 through the coil of the relay K2 and closed relay contacts K7 and K2B to a main lead 129. Accordingly, the relay K2 remains energized when the contact 79 returns to the terminal 80. Contact 79 cannot be returned to the terminal 80, because of the operaton of the mechanical portion of the interlock control described above, until both the commodity name printing plate 26 and the price setting means 28 are changed. The relay contacts K7 open after the first successful scan (relay K7 shown in line 64 of FIG. XXIII in the above application Serial No. 92,233 is operated by the closure of the scanner out switch SW20 in such line 64). Hence, movement of the contact 79 from the terminal 80 to the terminal 81, upon removal of the commodity name printing plate 26, causes the relay contacts K3B to open disabling the rest of the control circuit and the relay contacts K2C to open preventing operation of the print solenoid PS, such prevention of operation of the print solenoid PS lasting until relay contacts K7 open after the first successful scan breaking the circuit through a lead 130 from the relay K2 through the relay contacts K7 and K2B to the main lead 129. This causes deenergization of the relay K2 and the relay contacts K2A and K2B open and the relay contacts K2C close. Closing of the relay contacts K2C permits closure of a circuit from the main lead 128 through the lead 126, the print solenoid PS, the closed relay contacts K2C and the relay contacts K3B to ground.

Return of the contact 79 to the terminal 80 does not affect the relay K2 since its seal-in contacts K2B are closed. Accordingly, when the contact 79 returns to the terminal 80, the relay contacts K2C remain open preventing operation of the print solenoid PS. Return of the contact 79 to the terminal 80 completes a circuit through the coil of the relay K3 and through the closed relay contacts K2A and the contact 79 to ground. Energization of the relay K3 causes the relay contacts K3A and K3B to close. Closing of the relay contacts K3A seals in the circuit through the coil of the relay K3 after the relay contacts K2A open and the closing of the relay contacts K3B completes a circuit from the lead 130 to the lead 127 enabling the rest of the control circuit 29. After completion of the first successful scan, the relay contacts K7 open breaking the circuit from the lead 128 through the coil of the relay K2 to the lead 129. Deenergization of the relay K2 causes the relay contacts K2A to open (this does not affect the relay K3 because it is sealed in through the relay contacts K3A), the relay contacts K2B, to open (this keeps the relay K2 deenergized when the contacts K7 close again) and the relay contacts K2C to close. Closing of the relay contacts K2C permits operation of the print solenoid PS as above described. The weighing of the new series of packaged commodities is continued without interruption as long as the interlock contact 79 is not operated. As long as the contact 79 remains on the terminal 80, the relay K3 remains energized and its contacts K3B remain closed enabling the rest of the control circuit 29 (FIG. 1) and the relay K2 remains deenergized keeping the relay contacts K2C closed permitting operation of the print solenoid PS now that one weighing cycle has been completed.

One of the features of the electrical portion of the interlock control resides in the superior simplicity of the circuit shown in FIG. 2. Comparing the circuit shown in FIG. 2 with the interlock control circuit shown in lines 49–55 of FIG. XXIII in the above application Serial No. 92,233, the same interlocking functions are accomplished without relay K1, its contacts, and switch SW9 shown in such lines 49–55.

Requiring a weighing cycle after every interlock change is accomplished by the circuitry shown in FIG. 2. Movement of the contact 79 from the terminal 80 to the terminal 81 and back to the terminal 80 energizes the relay K2 which is held energized through its closed seal-in contacts K2B. The energized relay K2 holds its contacts K2C open preventing energization of the print solenoid PS until a weighing cycle causes the contacts K7 to open deenergizing the relay K2 which deenergization permits closing of its contacts K2C allowing operation of the print solenoid PS and which deenergization allows its contacts K2B to open keeping the relay K2 deenergized even after the contacts K7 close again. Hence, every interlock change opens the contacts K2C immobilizing the print circuit, the contacts K2C remaining open until a weighing cycles causes the relay K2 to be dropped out to close the contacts K2C.

In the overall operation of the interlocking control, when switching to pre-packaging a different cut of beef, it is necessary for the operator to replace the commodity name printing plate 26 with another and probably to reset the price setting means 28. The operator removes the plate 26 by sliding it out of the holder 27. This permits the spring 73 to move the slide 59 and the attached rod 64 to the left as viewed in FIG. 3 with trigger-like action. The slide 59 cannot be returned to its home position by finger pressure on the slide handle 63 until a commodity name printing plate 26 is inserted in the printer and the price setting means 28 changed.

Such movement of the rod 64 to the left carries the collar 75 on the rod 64 out of operative engagement with the switch actuating roller 78 and the contact 79 moves from the terminal 80 to the terminal 81. Opening of the circuit at the terminal 80 drops out the relay K3 permitting its contacts K3B to open disabling the rest of the control circuit (prevents computation of a total value). Closing of the circuit at the terminal 81 causes the relay K2 to be energized. The energized relay K2 opens its contacts K2C preventing energization of the print solenoid PS.

The operator inserts a commodity name printing plate 26 into the printer and resets at least one of the price setting arms 91 conditioning the slide 59 for movement. He then moves the slide 59 to the right as viewed in FIG. 3 until the pawl 84 latches it as shown in FIG. 3. This operates the switch 77 returning the contact 79 to its position shown in FIG. 2, opening the circuit at the terminal 81 and closing the circuit at the terminal 80.

Opening of the circuit at the terminal 81 accomplishes nothing, since the relay K2 is sealed in through its seal in contact K2B. Closing of the circuit at the terminal 80 causes energization of the relay K3 through the closed contact K2A. The energized relay K3 closes its contacts K3B enabling the rest of the control circuit. After the completion of the first successful scan, the relay contacts K7 open dropping out the relay K2, whereupon the normally closed relay contacts K2C close permitting operation of the print solenoid PS. The relay contacts K3B and K2C remain closed continuing the enabling of the rest of the control circuit 29 and permitting operation of the print solenoid PS, respectively, until the next interlock change.

It is to be understood that the above description is illustrative of the invention and that various modifications thereof can be utilized without departing from its spirit and scope.

Having described the invention, we claim:

1. In an automatic condition measuring apparatus, in combination, condition identifying means, multiplier factor setting means, and means responsive to a change in the condition identifying means for preventing a change in the setting of the multiplier factor setting means before said change in the condition identifying means.

2. In an automatic condition measuring apparatus having an operating cycle, in combination, condition identifying means, multiplier factor setting means, and interlock means responsive to a change in the condition identifying means for preventing the operating cycle unless the change is accompanied by a change in the setting of the multiplier factor setting means, said interlock means also preventing a change in the setting of the multiplier factor setting means before said change in the condition identifying means.

3. In an automatic condition measuring apparatus having an operating cycle, in combination, condition identifying means, multiplier factor setting means, mechanical interlock means responsive to a change in the condition identifying means for preventing a change in the setting of the multiplier setting means before said change in the condition identifying means, and electrical interlock means operated by the mechanical interlock means for preventing the operating cycle unless said change in the condition identifying means is accompanied by a change in the setting of the multiplier factor setting means.

4. A computing and printing weighing scale comprising, in combination, condition identifying means adapted to be set to represent various commodities, multiplier factor setting means adapted to be set to various factors, and mechanical interlock means responsive to a change in the condition identifying means for preventing a change in the setting of the multiplier factor setting means before a change in the condition identifying means, said mechanical interlock means including two latches responsive to said change in the condition identifying means for immobilizing the interlock means until both the condition identifying means and the multiplier factor setting means have been reset.

5. A computing and printing weighing scale system having an operating cycle comprising, in combination, condition identifying means adapted to be readily replaceable in the system by other condition identifying means, multiplier factor setting means adapted to be set to various factors, mechanical means responsive to removal of the condition identifying means from the system, and electrical interlock means operated by the mechanical means for preventing the operating cycle unless the condition identifying means is replaced in the system and the multiplier factor setting means is reset.

6. A computing and printing weighing scale system having an operating cycle comprising, in combination, condition identifying means adapted to be readily replaceable in the system by other condition identifying means, multiplier factor setting means adapted to be set to various factors, mechanical means automatically movable from a first to a second position in response to removal of the condition identifying means from the system, said mechanical means including two latches responsive to said removal of the condition identifying means from the system for immobilizing the mechanical means until the condition identifying means has been replaced in the system and the multiplier factor setting means has been reset whereupon the mechanical means is movable to its first position, and electrical interlock means operated by the mechanical means for preventing the operating cycle after the mechanical means responds to the removal of the condition identifying means from the system and for enabling the operating cycle after the mechanical means is returned to its first position.

7. A computing and printing weighing scale system comprising, in combination, condition identifying means movable in the system between operative and inoperative positions, multiplier factor setting means, and mechanical interlock means responsive to movement of the condition identifying means from its operative to its inoperative position for preventing a change in the setting of the multiplier factor setting means before such movement of the condition identifying means, said mechanical interlock means including latch means for immobilizing the interlock means until the condition identifying means has been returned to its operative position in the system and the multiplier factor setting means has been reset.

8. A computing and printing weighing scale comprising, in combination, commodity identifying means, multiplier factor setting means, first latch means for preventing a change in the setting of the multiplier factor setting means, mechanical interlock means movable from a first to a second position in response to a change in the commodity identifying means for unlatching the first latch means after said change, and second latch means responsive to said change for preventing the return of the mechanical interlock means to its first position until the commodity identifying means is reset, the unlatched first latch means also preventing the return of the mechanical interlock means to its first position and being responsive to a change in the setting of the multiplier factor setting means to permit the return of the mechanical interlock means to its first position after said multiplier factor setting means change, the mechanical interlock means being movable from its second position back to its first positions after said changes to again latch the first latch means.

9. In a computing and printing weighing scale system having an operating cycle, condition identifying means, multiplier factor setting means and electrical interlock means for preventing said cycle after a change in the condition identifying means unless the change is accompanied by a change in the setting of the multiplier factor setting means, mechanical means for operating the electrical interlock means comprising, in combination, a slide movable from a first to a second position in response to removal of the condition identifying means from the system, and means for preventing the return of the slide to its first position unless the condition identifying means is replaced in the system and the multiplier factor setting means is reset.

10. In a computing and printing weighing scale system having an operating cycle, condition identifying means, multiplier factor setting means and electrical interlock means for preventing said cycle after a change in the condition identifying means unless the change is accompanied by a change in the setting of the multiplier factor setting means, mechanical means for operating the electrical interlock means comprising, in combination, resilient means, slide means driven by the resilient means from a first position to a second position in response to removal of the condition identifying means from the system, whereby the electrical interlock means prevents said cycle, and means for preventing the return of the slide means to its first position unless the condition identifying means is replaced in the system and the multiplier factor setting means is reset, the electrical interlock means enabling said cycle upon the return of the slide means in opposition to the resilient means to its first position.

11. In a computing and printing weighing scale system having an operating cycle, condition identifying means, multiplier factor setting means and electrical interlock means for preventing said cycle after a change in the condition identifying means unless the change is accompanied by a change in the setting of the multiplier factor setting means, mechanical means for operating the electrical interlock means comprising, in combination, a slide movable from a first to a second position in response to removal of the condition identifying means from the system, first latch means operable by the slide for preventing a change in the setting of the multiplier factor setting means before a change in the condition identifying means, the first latch means being unlatched by the slide when the slide moves into said second position enabling a change in the setting of the multiplier factor setting means and the electrical interlock means preventing said cycle when the slide is in said second position, and second latch means responsive to movement of the condition identifying means for preventing the return of the slide to its first position unless the condition identifying means is replaced in the system, the first latch means functioning additionally to prevent the return of the slide to its first position unless the multiplier factor setting means is reset, the first latch means being latched by the slide when the slide is returned to said first position preventing change in the setting of the multiplier factor setting means and the second latch means latching the slide when the slide is in said first position until the condition identifying means is removed from the system, the electrical interlock means enabling said cycle when the slide is in said first position.

12. In an automatic weighing scale system having a printer, including a removable commodity name printing plate and unit price setting means, and electrical interlock means for preventing the operation of the printer after removal of the printing plate from the printer unless the change is accompanied by a change in the setting of the unit price setting means, in combination, mechanical interlock means for operating the electrical interlock means and for preventing a change in the setting of the unit price setting means before said removal of the printing plate from the printer comprising a slide movable from a first position to a second position in response to said removal of the printing plate from the printer, first latch means operable by the slide for preventing a change in the setting of the unit price means, the first latch means being unlatched by the slide when the slide moves into said second position enabling a change in the setting of the unit price setting means and the electrical interlock means preventing the operation of the printer when the slide is in said second position, and second latch means responsive to movement of the printing plate for preventing the return of the slide to its first position unless the printing plate is replaced in the printer, the first latch means functioning additionally to prevent the return of the slide to its first position unless the unit price setting means is reset, the first latch means being latched by the slide when the slide is returned to said first position preventing change in the setting of the unit price setting means and the second latch means latching the slide when the slide is in said first position until the printing plate is removed from the printer, the electrical interlock means continuing to prevent the operation of the printer when the slide is returned to said first position, and additional means operable after return of the slide to said first position for operating the electrical interlock means to permit the operation of the printer.

13. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, and means for preventing a change in the setting of the price setting means during computation.

14. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, condition identifying means adapted to be set to represent various commodities including said weighed commodity, and interlock means responsive to a change in the setting of the condition identifying means for preventing computation unless said change is accompanied by a change in the setting of the price setting means, said interlock means also preventing a change in the setting of the price setting means during computation.

15. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including a removable printing plate for printing the name of the commodity, means for setting the value reading into the printer, and interlock means responsive to a change in the printing plate for preventing operation of the printer after such change unless such change is accompanied by a change in the setting of the price setting means.

16. A computing weighing scale having a weighing cycle comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including a removable printing plate for printing the name of the commodity, means for setting the value reading into the printer, and interlock means responsive to a change in the printing plate for preventing operation of the printer after such change unless such change is accompanied by a change in the setting of the price setting means and until the completion of a weighing cycle.

17. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including a removable printing plate for printing the name of the commodity, means for setting the value reading into the printer, and interlock means responsive to a change in the printing plate for preventing operation of the printer after such change unless such change is accompanied by a change in the setting of the price setting means, said interlock means functioning additionally to prevent a change in the setting of the price setting means before said change in the printing plate.

18. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including a removable printing plate for printing the name of the commodity, means for setting the value reading into the printer, and interlock means responsive to a change in the printing plate for preventing operation of the printer after such change unless such change is accompanied by a change in the setting of the price setting means, said interlock means functioning additionally to prevent a change in the setting of the price setting means during computation.

19. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including settable printing means for printing the name of the commodity, means for setting the value reading into the printer, mechanical interlock means for preventing a change in the setting of the price setting means before a change in the setting of the printing means, electrical interlock means operated by the mechanical interlock means for preventing operation of the printer after said change in the setting of the printing means, and means for disabling the electrical interlock means to permit reoperation of the printer.

20. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including settable printing means for printing the name of the commodity, means for setting the value reading into the printer, mechanical interlock means for preventing a change in the setting of the price setting means before a change in the setting of the printing means, and electrical interlock means operated by the mechanical interlock means for preventing computation after said change in the setting of the printing means unless said change in the setting of the printing means is accompanied by a change in the setting of the price setting means.

21. A computing weighing scale comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including printing means movable between operative and inoperative first and second positions, respectively, for printing the name of the commodity, means for setting the value reading into the printer, and mechanical interlock means for preventing a change in the price setting means before a movement of the printing means from a said first to a second position and including slide means, first latch means operated by the slide means for latching the price setting means against movement before said movement of the printing means and for latching the slide means against movement after said movement of the printing means unaccompanied by a change in the setting of the price setting means, second latch means operated by the printing means for latching the slide means against movement in a first position of the slide means before said movement of the printing means and for latching the slide means against movement in a second position of the slide means after said movement of the printing means, the slide means being movable automatically from said first to said second position in response to said movement of the printing means and being selectively movable from said second to said first position after movement of the printing means from a said second to a first position and after a change in the setting of the price setting means, the slide means after being returned to said first position again being latched by the second latch means operating the first latch means which again latches the price setting means until the next movement of the printing means from a said first to a second position.

22. A computing weighing scale having an automatic operating cycle comprising, in combination, a computer, means for setting a factor corresponding to the weight of a weighed commodity into the computer, price setting means for setting a factor corresponding to the unit price of the commodity into the computer, the computer multiplying one factor by the other to obtain a value reading, a printer including a printing plate for printing the name of the commodity supported for unobstructed removal from the printer before, during, or after the operating cycle, mechanical interlocking means responsive to said removal for preventing a change in the setting of the price setting means before said removal, and electrical interlock means operated by the mechanical interlock means for preventing or interrupting the operating cycle after said removal, the mechanical interlock means being selectively operable after the return of a printing plate into the printer accompanied by said change in the setting of the price setting means to operate the electrical interlock means which when so operated enables the operating cycle.

References Cited in the file of this patent

UNITED STATES PATENTS

| | | |
|---|---|---|
| 2,894,449 | Boyden et al. | July 14, 1959 |
| 2,948,465 | Allen | Aug. 9, 1960 |
| 3,037,563 | Allen | June 5, 1962 |
| 3,042,128 | Bell et al. | July 3, 1962 |
| 3,044,691 | Allen | July 17, 1962 |